United States Patent [19]
Zohler

[11] Patent Number: 4,890,669
[45] Date of Patent: Jan. 2, 1990

[54] POROUS COATING FOR ENHANCED TUBES

[75] Inventor: Steven R. Zohler, Manlius, N.Y.

[73] Assignee: Carrier Corporation, Syracuse, N.Y.

[21] Appl. No.: 174,291

[22] Filed: Mar. 28, 1988

Related U.S. Application Data

[62] Division of Ser. No. 881,437, Jul. 2, 1986, Pat. No. 4,753,849.

[51] Int. Cl.⁴ .............................................. F28F 13/18
[52] U.S. Cl. ........................................ 165/133; 62/527
[58] Field of Search ............... 165/133, 907, 186, 185, 165/122; 428/586, 546; 62/527

[56] References Cited

U.S. PATENT DOCUMENTS

| | | | |
|---|---|---|---|
| 4,288,897 | 9/1981 | Withers, Jr. | 165/133 X |
| 4,354,550 | 10/1982 | Modahl et al. | 62/527 X |
| 4,359,086 | 11/1982 | Sanborn et al. | 165/133 |
| 4,381,818 | 5/1983 | Sachar et al. | 165/133 |

Primary Examiner—Larry Jones
Attorney, Agent, or Firm—Robert H. Kelly

[57] ABSTRACT

A porous coated enhanced evaporator tube and a method for producing the tube. The porous coating of the tube is applied by arc spraying two dissimilar metals on a tube and then etching the tube so that only one of the metals is etched out, and a porous surface, having voids where the etched out metal is developed. The voids form subsurface channels which provide nucleate boiling sites.

2 Claims, 1 Drawing Sheet

U.S. Patent   Jan. 2, 1990   4,890,669
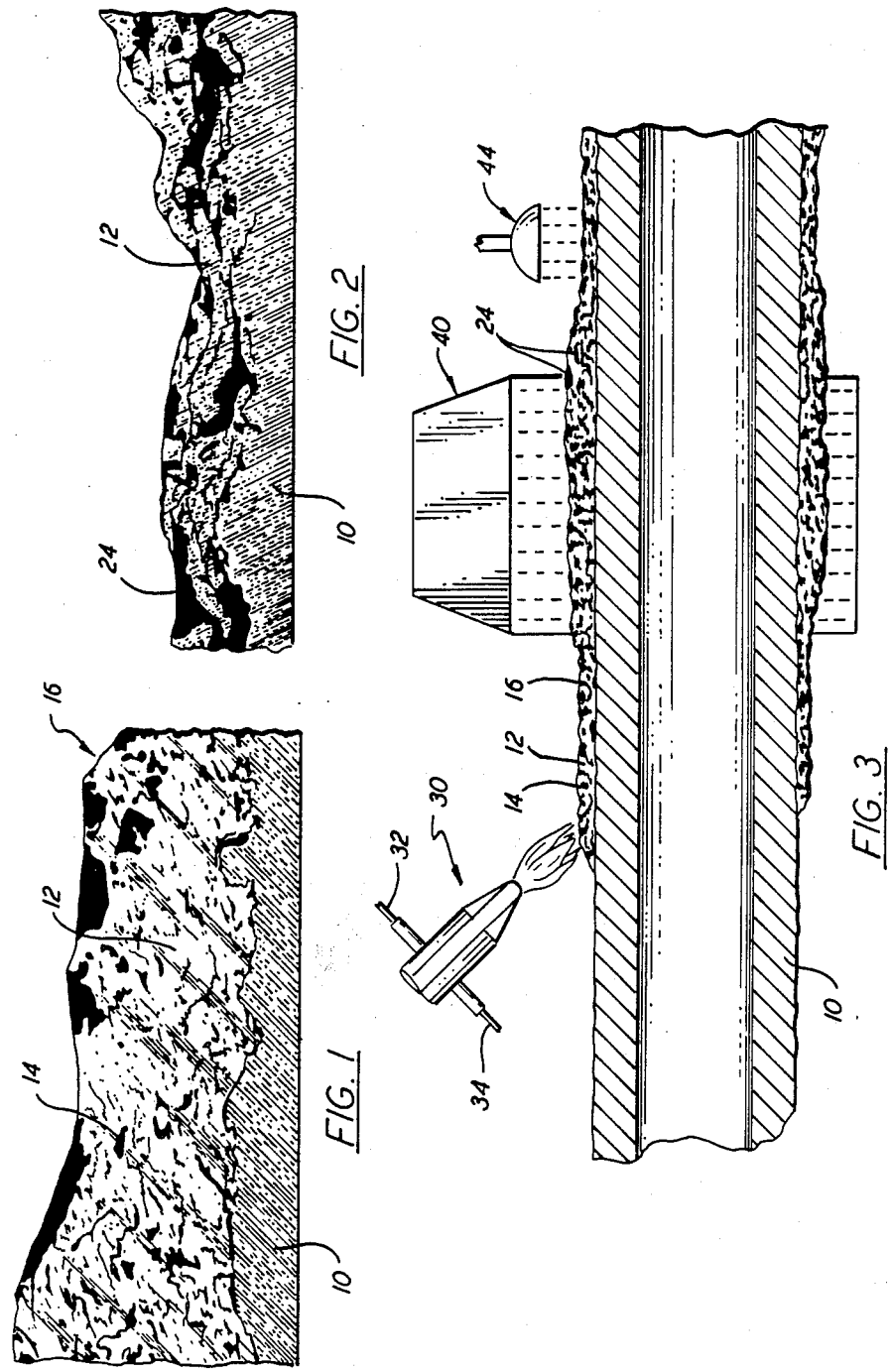

POROUS COATING FOR ENHANCED TUBES

This application is a division of application Ser. No. 881,437, filed July 2, 1986, now U.S. Pat. No. 4,753,849, issued June 28, 1988.

BACKGROUND OF THE INVENTION

This invention relates generally to enhanced tubes and more particularly to porous coated enhanced tubes and a method of enhancing evaporator tubes.

In an evaporator of certain refrigeration systems a fluid to be cooled is passed through heat transfer tubing while refrigerant in contact with the exterior of the tubing changes state from a liquid to a vapor by absorbing heat from the fluid within the tubing. The external and internal configuration of the tubing are important in determining the overall heat transfer characteristics of the tubing. For example, it is known that one of the most effective ways of transferring heat from the fluid within the tube to the boiling refrigerant surrounding the tube is through the mechanism of nucleate boiling.

It has been theorized that the provision of vapor entrapment sites or cavities on a heat transfer surface cause nucleate boiling. According to this theory the vapor trapped in the cavities forms the nucleus of a bubble, at or slightly above the saturation temperature, and the bubble increases in volume as heat is added until surface tension is overcome and a vapor bubble breaks free from the heat transfer surface. As the vapor bubble leaves the heat transfer surface, liquid enters the vacated volume trapping the remaining vapor and another bubble is formed. The continual bubble formation together with the convection effect of the bubbles traveling through and mixing the boundary layer of superheated refrigerant, which covers the vapor entrapment sites, results in improved heat transfer. A heat exchange surface having a number of discrete artificial nucleation sites is disclosed in U.S. Pat. No. 3,301,314.

It is known that a vapor entrapment site or cavity produces stable bubble columns when it is of the re-entrant type. In this context, a re-entrant vapor entrapment site is defined as a cavity in which the size of the surface pore is smaller than the subsurface cavity. Heat transfer tubes having re-entrant type pores are disclosed in U.S. Pat. Nos. 3,696,861 and 3,768,290.

It has been discovered that an excessive influx of liquid from the surroundings can flood or deactivate a re-entrant type vapor entrapment site. However, a heat transfer surface having subsurface channels communicating with the surroundings through surface openings or pores have been found to provide good heat transfer and prevent flooding of the vapor entrapment site.

As disclosed in U.S. Pat. No. 4,438,807 assigned to the present assignee, an internally and externally enhanced heat transfer tube, having an internal rib and an external helical fin (creating a subsurface channel) communicating with the surrounding liquid through surface openings (pores) is manufactured by a single pass process with a tube finning and rolling machine. According to the disclosed process a grooved mandrel is placed inside an unformed tube and a tool arbor having a tool gang thereon is rolled over the external surface of the tube. The unformed tube is pressed against the mandrel to form at least one internal rib on the internal surface of the tube. Simultaneously, at least one external fin convolution is formed on the external surface of the tube by finning discs on the tool gang. The external fin convolutions form subsurface channels therebetween. The external fin convolutions also have depressed sections above the internal rib where the tube is forced into the grooves of the mandrel to form the rib. A smooth roller-like disc on the tool arbor is rolled over the external surface of the tube after the external fin convolution is formed. The smooth roller-like disc is designed to bend over the tip portion of the external fin so that it touches the adjacent fin convolution and forms an enclosed subsurface channel. However, the tip portion of the depressed sections of the external fin, which are located above the internal rib, are also bent over but do not touch the adjacent convolutions, thereby forming pores which provide fluid communication between the fluid surrounding the tube and the subsurface channels. However, this method of enhancing tubes does not lend itself to enhancing hard tubes, such as titanium.

As disclosed in U.S. Pat. No. 4,129,181 an externally enhanced heat transfer tube is manufactured by applying a very porous reticulated organic foam layer in contact with the tube surface, and then plating a thin metal coating on the foam substrate. The foam layer is then pyrolyzed in the range of 575°–900° F. which can result in degradation of the mechanical properties of the base tube by annealing the tube.

As disclosed in U.S. Pat. No. 3,990,862 an externally enhanced heat transfer tube is manufactured by spraying of metallizing of metallic powders to a metallic substrate using a single spray nozzle in which the oxidizer-fuel gas balance is of prime importance.

Thus, there is a clear need for a method and apparatus for applying a porous coating to an evaporator tube that would, to a large extent, overcome the inadequacies that have characterized the prior art.

SUMMARY OF THE INVENTION A method of providing a porous surface on a copper tube by providing nucleate boiling sites in accordance with the principles of the present invention is characterized by producing an enhanced tube by means of arc spraying copper and dissimilar metals, which are thermally sprayed in a molten state and form a pseudoalloy surface, onto the copper tube. The sprayed tube is then placed into a HCl solution where the dissimilar metal is etched out of the pseudoalloy surface. Thus, a porous copper surface consisting of voids or cavities existing in locations previously occupied by the dissimilar metal particles is produced.

Accordingly, it is an object of the present invention to provide a heat transfer tube having superior heat transfer characteristics.

Another object of the present invention is to provide a method of producing a porous coating for an enhanced copper tube.

A further object of the present invention is to provide a high performance evaporator tube for a refrigeration system whereby a cost-effective evaporator can be constructed using this tubing.

These and other objects of the present invention are attained by a novel method for applying a porous coating on an enhanced evaporator tube.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

Other objects and advantages of the present invention will be apparent from the following detailed description in conjunction with the accompanying drawings, forming a part of this specification, and in which reference numerals shown in the drawings designate like or corresponding parts throughout the same, in which:

FIG. 1 is a drawing depicting a cross-sectional photomicrograph view of an arc-sprayed surface of Zn/Cu on a copper tube at approximately 400X;

FIG. 2 is a drawing depicting a cross-sectional photomicrograph view of the etched surface of FIG. 1 at the same magnification factor; and FIG. 3 is a schematic representation of the process by which the porous coating of the present invention is applied to a copper tube.

DESCRIPTION OF THE PREFERRED EMBODIMENTS

The embodiment of the present invention described below is especially designed for use in an evaporator of a refrigeration system having a fluid to be cooled passing through heat transfer tubes and having refrigerant which is vaporized in contact with the external surfaces of the tubes. Typically, a plurality of heat transfer tubes are mounted in parallel and connected so that several tubes form a fluid flow circuit and a plurality of such parallel circuits are provided to form a tube bundle. Usually, all the tubes of the various circuits are contained within a single casing wherein they are immersed in the refrigerant. The heat transfer capabilities of the evaporator are largely determined by the heat transfer characteristics of the individual heat transfer tubes.

Referring now to the drawings, FIG. 1 is a cross-sectional depiction of an approximately 400X photomicrograph of a copper tube 10 which has been arc-sprayed with Zn/Cu pseudoalloy having copper particles 12 and zinc particles 14 (shown as darker portions than the copper). The layer of Zn/Cu pseudoalloy 16 is applied directly to the copper tube substrate. Other pseudoalloy materials may be used, e.g. Al/Cu, but the materials are generally two dissimilar metals—one of which is the same as the substrate metal.

FIG. 2 is a cross-sectional depiction of an approximately 400X photomicrograph of the copper tube 10 of FIG. 1, after the layered tube has been chemically etched, e.g. with HCl. As can be seen, a porous copper surface having voids or cavities 24 existing in locations previously occupied by the zinc particles 14 is developed in every direction through the copper particles 12. Accordingly, subsurface channels are formed by the voids 24, which communicate with the surrounding liquid and provide for communication of liquid and vapor between voids 24 and the surrounding fluid.

Referring now to FIG. 3, a preferred process is shown by which the arc-sprayed porous coating comprising two dissimilar metals (e.g. Zn/Cu or Al/Cu) are thermally sprayed in a molten state onto the copper tube 10. The metal to be sprayed is fed into the arc spray gun 30 in wire form, i.e. copper wire 32 and zinc wire 34. When an electrical current is passed through the wires 32 and 34, from a power supply (not shown), an arc is formed. The wires are melted by the arc and form a pseudoalloy and are propelled onto the copper tube by a propulsion means, such as compressed air, to form a mixed layer of copper particles 12 and zinc particles 14. The copper tube 10 with the pseudoalloy surface 16 in the Figure, is moving from left to right. Acid bath 40 then etches the pseudoalloy surface 16, using HCl or similar acid, resulting in voids or cavities 24 being formed in the locations previously occupied by the zinc particles 14. The tube 10 is finally rinsed in rinsing means 44 to remove any acid.

One major advantage of the enhanced tube of the present invention is the ease with which it can be manufactured. The improved heat transfer properties for flooded evaporator tubes using the present invention by providing nucleate boiling sites in a cost-effective manner is an improvement over the prior art.

While this invention has been described with reference to a particular embodiment disclosed herein, it is not confined to the details set forth herein and this application is intended to cover any modifications or changes as may come within the scope of the invention.

What is claimed is:

1. An enhanced evaporator tube for transferring heat between a liquid refrigerant in contact with the exterior surface of the tube and a fluid flowing through the tube, comprising:
    a first metal substrate tube having an unenhanced exterior surface; and
    a layer of metal particles generally similar to said first metal bonded in thermal conducting relationship to said substrate tube, said layer of metal particles having random voids in every direction through said layer of metal particles wherein said voids form interconnecting subsurface channels which communicate with the liquid refrigerant to vaporize the liquid refrigerant in said voids forming interconnecting subsurface channels.

2. An enhanced evaporator for transferring heat between a liquid refrigerant in contact with the exterior surface of the tube and a fluid flowing through the tube as set forth in claim 1, wherein said first metal substrate tube is copper.

* * * * *